Jan. 21, 1969   R. P. ARENS ET AL   3,423,489
ENCAPSULATION PROCESS
Filed Nov. 1, 1966

INVENTOR.
ROBERT P. ARENS
NORMAN P. SWEENY
BY Carpenter, Kinney & Coulter
ATTORNEYS

United States Patent Office 3,423,489
Patented Jan. 21, 1969

3,423,489
ENCAPSULATION PROCESS
Robert P. Arens, North St. Paul, and Norman P. Sweeny, North Oaks, Minn., assignors to Minnesota Mining and Manufacturing Company, St. Paul, Minn., a corporation of Delaware
Filed Nov. 1, 1966, Ser. No. 591,326
U.S. Cl. 264—4                                    15 Claims
Int. Cl. B29c 13/00

This invention relates to a process for encapsulation of liquids, including aqueous liquids in tiny capsules, and to certain of the capsules formed thereby.

Various methods have been devised to form capsules by encapsulation of liquid materials in shells, which are at some later time ruptured, generally by heat and/or pressure, to release the contents of the capsules. For example, a wide variety of materials, including adhesives, dyes, cleaning solutions, foods, lubricants, pesticides, and many others, have been packaged in capsules for release at a later time. One known encapsulation technique involves forming an emulsion of the material to be encapsulated in a solution of the encapsulating medium causing shells of the encapsulating medium to form around the tiny droplets of the emulsion. Capsules are recovered on hardening of the shells. Another method involves atomizing a high surface tension material to be encapsulated, depositing a low surface tension encapsulating medium around the electrically charged droplets while airborne, and hardening the coating before collecting the capsules.

A still further method, which is limited to the formation of larger capsules, such as those used for vitamins or medical preparations, involves dropping the materials from concentric tubes. The material to be encapsulated is fed through a central tube and the encapsulating medium is fed through a surrounding concentric tube; for example, see U.S. Patent 2,799,897 to Jansen, issued July 23, 1957. A modification of this technique, also limited to the formation of relatively large capsules, is that shown in U.S. Patent 2,911,672, to Van Erven Dorens in which a concentric composite biliquid stream is discharged downwardly directly into a cooling bath and formed into capsules by means of a pulsating ring of encircling cooling liquid. This method is limited in production rate by the fact that the speed at which the composite stream travels is limited by resistance of the cooling bath to flow therethrough of the composite stream, and by limitations in the frequency at which pulses can be caused to travel through the cooling liquid, and by practical limitations on the velocity at which the cooling liquid may be pumped to carry away the capsules from the forming zone before they are sufficiently hardened so as not to adhere to one another on contact.

Another method of encapsulation is that shown in U.S. Patent No. 3,015,128 to Somerville, issued Jan. 2, 1962, wherein a circularly shaped curtain of the encapsulating liquid is maintained by flow of the liquid over a circular wall having orifices around the circumference. The material to be encapsulated is caused to impinge upon the curtain by dropping the fill material on a rotating distributor plate positioned centrally within the circular curtain. The centrifugal force of the distributor plate drives droplets of the fi l material through the wall orifices covered by the falling curtain where the droplets pick up a coating of the encapsulating material. The coated droplets assume a spherical shape due to surface tension, and can be hardened by air drying or by other means. This method requires relatively complex equipment and careful process control, as it is difficult to form capsules of uniform size and shape. There is also a likelihood of air being entrained within the capsules by virtue of being carried along with the rapidly moving material as it impinges the falling curtain or by occlusion as the shell material wraps around the droplet of fill material.

The present invention makes feasible the encapsulation of a wide variety of liquids, aqueous, organic and inorganic, in a wide variety of encapsulating materials. The method of this invention is extremely simple and easily controlled, and can be used to produce spheroidal capsules ranging in diameter from about 10 to 4000 microns. In the 800 to 3000 micron diameter range the bulk of capsules produced and the ease of handleability thereof are optimized, and processing problems such as plugging of orifices are minimized, and thus this size range is preferred. Smaller capsules require smaller orifices and higher pressures. Larger capsules require more care in handling.

This invention makes possible the formation of capsules by physical means at extremely high production rates, in the order of 30,000 to 120,000 capsules per orifice per minute, and by virtue of its ability to encapsulate aqueous liquids makes possible for the first time the economically practical encapsulation of water soluble chemical components for subsequent use in chemically reactive systems. The invention further makes possible the production of well-formed capsules having excellent sphericity, uniform wall thicknesses, and leakproofness. In some embodiments, unlike previously known processes, the process is independent of the surface tensions of the liquids, i.e., it is possible to encapsulate low surface tension liquids within high surface tension liquids.

Briefly summarized, the present invention involves forming a concentric biliquid column having an inner core of liquid to be encapsulated and an outer tube of hardenable liquid encapsulating material which is caused to travel as a stream in a trajectory path for a time sufficient to allow the column to constrict due to natural forces, i.e. cohesive forces, surface tension and the like, first into a "string of capsules" and then ultimately into individual droplets or capsules in which the encapsulating material completely encloses the encapsulated liquid. The encapsulating material is congealed sufficiently upon separation of the stream into individual capsules to withstand impact upon falling. If desired the process conditions can be controlled to produce connected strings of capsules by congealing the encapsulating material sufficiently to maintain the connecting strands intact, thus preventing separation of the strem into individual capsules. It is much preferred to direct the biliquid column or stream to travel through a gaseous medium, such as air in a state or free fall in a trajectory path having horizontal components, rather than into a liquid medium.

A preferred method of forming a biliquid column is by forcing a jet of fill liquid through a body of liquid encapsulating material, the jet being directed to cause the resulting biliquid column to follow the desired trajectory. The column is apparently formed by frictional forces between the fast moving jet of fill liquid and the encapsulating liquid which enables the fill liquid stream to drag along with it a concentric shell of the encapsulating liquid, which shell is rapidly accelerated to a velocity equal to that of the fill liquid jet due to momentum exchange.

The invention will be further explained with reference to the accompanying drawings wherein.

Figures 1, 4:
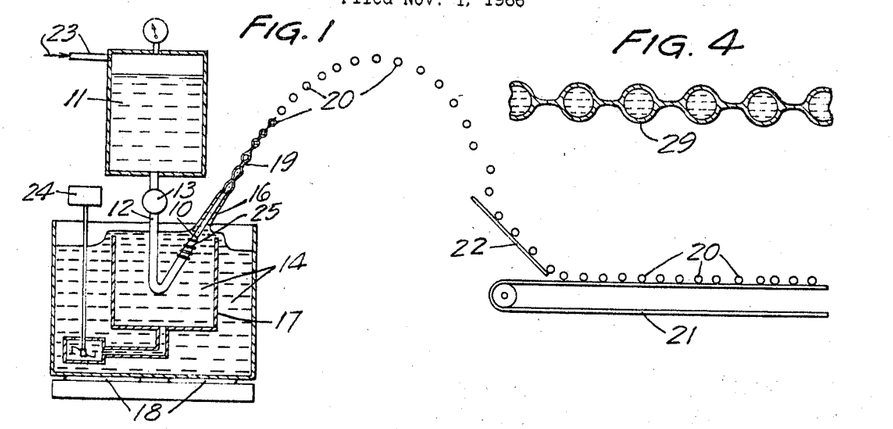
FIGURE 1 is a diagrammatic view illustrating one mode of performing the method of the present invention showing the elements greatly enlarged.
FIGURE 4 is a cross-sectional view of a string of capsules of this invention.

In FIGURE 1 is seen a submerged, generally upwardly pointed nozzle 10 for discharging liquid 11 to be encapsulated at a velocity sufficient to form a jet. Nozzle 10 is supplied by conduit means 12 provided with a needle valve or the like 13 to control the flow, and is immersed beneath the surface of a bath 14 of hardenable liquid encapsulating material. As the fill liquid 11 is ejected from nozzle 10 it carries with it an outer shell of liquid encapsulating material 14 to form a biliquid column 16. The level of the liquid encapsulating material 14 can be conveniently maintained at an even distance above orifice 10 by means of a constant level overflow reservoir 17. The vessel containing the bath can be maintained at operating temperature by conventional heating means 18 as illustrated for this purpose. As the biliquid column 16 continues its trajectory path it constricts down to form a string of capsules 19 which ultimately separates to form capsules 20, or the string of capsules may be hardened before separation and recovered in the form of a string 29 as shown in FIGURE 4. Hardened capsules 20 are collected on a suitable collecting surface 22 such as an inclined plane, conveyor belt 21, or other receptor. Air pressure may be applied to the reservoir of fill liquid 11 as indicated by arrow 23. Preferably the encapsulating material 14 is constantly recirculated as by pump 24. It is also preferred to provide nozzle 10 with tip windings 25 of an electrical resistor or equivalent heating means to minimize congealing of encapsulating material around the nozzle.

Figure 2:
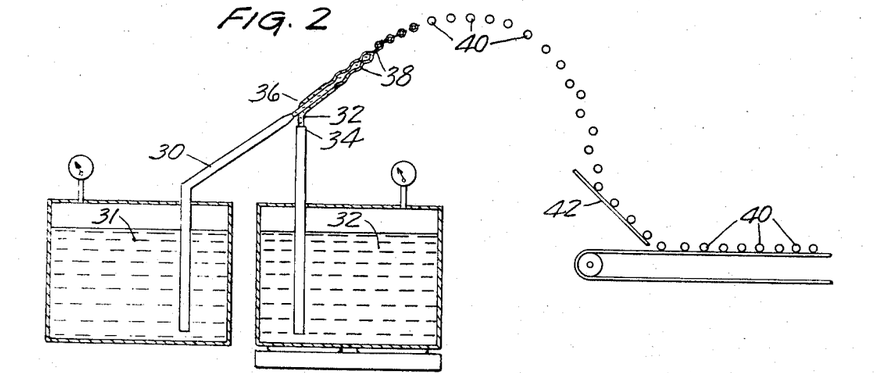
FIGURE 2 is a diagrammatic view of another embodiment of the method of the invention.

In the modification of FIGURE 2 a first nozzle 30, discharging a stream of higher surface tension material to be encapsulated 31, is so directed as to impinge a second stream of lower surface tension liquid encapsulating material 32 discharging from a second nozzle 34. The impinging streams merge to form a concentric biliquid column 36 which constricts at intervals along its length under natural forces to form a string of capsules 38 which ultimately separates into individual capsules 40. Hardened capsules 40 are collected on a suitable surface 42.

Figure 3:
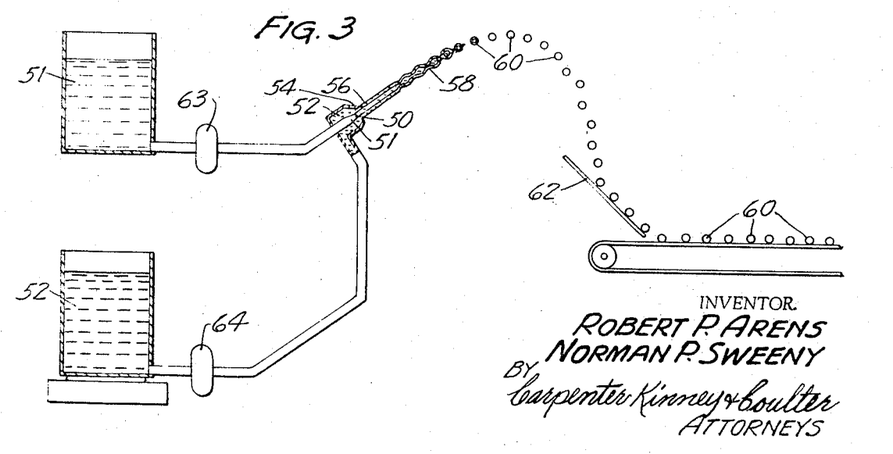
FIGURE 3 is a diagrammatic view of a still further embodiment of the method of the present invention.

In the embodiment of FIGURE 3 an orifice 50 is provided for discharging liquid 51 to be encapsulated into a body of liquid encapsulating material 52 supplied from a much larger concentric orifice 54. A stream of liquid 51 to be encapsulated carries along with it an outer tube of liquid 52 to form a biliquid column 56 which constricts under natural forces similarly to the biliquid columns shown in FIGURES 1 and 2 to form first a string of capsules 58 and subsequently individual capsules 60 which are collected on a suitable surface 62. The fill liquid 51 is delivered at a high velocity, for example, by pump 63. The encapsulating liquid 52 is delivered, for example, by pump 64, at a low rate, generally insufficient to form a jet but at a rate sufficient to continuously replace encapsulating material carried away by the stream of fill liquid as it passes through the encapsulating liquid in the formation of the biliquid column.

Rather than using concentric orifices 50, 54, as shown in FIGURE 3, two adjacent orifices can be used. For example, an encapsulating material supplying orifice may be positioned slightly above the fill liquid orifice to cause the encapsulating material to flow around the fill liquid orifice. The emerging fill liquid pulls along a concentric tube of encapsulating material to form a biliquid column.

A wide variety of encapsulating materials which are relatively fluid in the molten form and which solidify on cooling may be used in the practice of this invention. Among the materials found suitable are waxes, fats, proteins, carbohydrates, gellable colloid materials such as gelatin and agar-agar, low polymers, metals (generally low-melting alloys), fusible-congealable inorganic salts, glasses, and other fusible-congealable elements, compounds, or mixtures (such as naphthalene, sulphur, paradichlorobenzene, and the like). The preferred materials exhibit some stringiness or pituitous character. Preferred encapsulating materials are those of the heat liquifiable type which are solids at room temperature and are characterized by a sharply defined melting range, crystallization or solidification, and low heat of fusion. The capsule shell-forming encapsulating material should have a viscosity at the operating temperature sufficiently low for constrictions of the column and flow into capsular form to occur. The pressure required to form the biliquid column increases with increasing viscosity of the shell material. For pressures available in commercial equipment, it is preferred that the viscosity be below about 2000 centipoises. At low pressures, i.e. below about 3 atmospheres, the shell material viscosity is preferably below about 500 centipoises.

The fill liquid may be any material which is substantially insoluble in or immiscible with the encapsulating material under the storage conditions of the capsules, usually room temperature of about 23° C., and under the encapsulating conditions. In order to form a biliquid column, the two liquids used must be capable of remaining in the form of two distinct integral phases in contact with one another until one or both liquids are hardened by cooling. It is thus possible to encapsulate water and aqueous solutions, as well as organic liquids, or solutions, and liquid metals such as mercury or molten metals or alloys. Thus, almost any material sufficiently soluble in these media for purposes of intended use, e.g. dyestuffs, catalysts, and chemical reactants, can be encapsulated by this new process. The fill material should be liquid under the encapsulating conditions and may either remain liquid or solidify upon or after the capsules have been formed. The boiling point of the fill material should be higher than the melting point of the encapsulating material in order to avoid unwanted vaporization of the fill material. The boiling point of the fill material may be raised by increasing the pressure of the gaseous atmosphere into which the biliquid column is directed. If desired the fill liquid may contain ingredients capable of reacting with the encapsulating liquid, for example, to assist in hardening by precipitation or cure. Such ingredients may also be contained in the encapsulating material or in the gaseous atmosphere.

In the embodiments of FIGURES 1 and 3 the process operates independently of the relative surface tensions of the encapsulating and fill liquids. That is, it is possible to encapsulate low surface tension liquids within high surface tension liquids as well as vice versa. In the embodiment of FIGURE 2, however, it has been found that the higher surface tension liquid will form the inner core of the biliquid column while the lower surface tension liquid will form the outer concentric tube.

It will be noted that, particularly with the embodiments of FIGURES 1 and 3, there is no problem of air entrainment within the capsules. Thus the fill materials are readily encapsulated within the shell material free of any air. With the embodiments of FIGURES 2 and 3 the possibility of oxidation of the encapsulating material, for example, hot wax, due to contact of the hot molten material with air is minimized, and thus these emobdiments are preferred where degradation of the encapsulating material prior to hardening is a problem.

In the case of capsules above about 300 microns in diameter, due to the mass of shell material to be cooled, it has been found desirable to cause cooling to proceed from the inside outwardly by using a fill liquid considerably cooler than the liquid encapsulating material. Such cooling from the inside is rapid due to the higher rate of heat transfer between the two liquids than between the liquid shells and the surrounding gaseous atmosphere. Shells congealed by interior cooling have further been found to provide superior barrier properties in the case of crystallizable shell materials such as waxes which exhibit a large, i.e. more than 10% decrease in volume on congealing, and are characterized by significantly less stress cracking which would cause rapid leaking of the capsule contents. Unexpectedly, shells hardened or congealed by internal cooling have a dense, more impermeable structure characterized by a low rate of vapor diffusion along crystal boundaries. Internal cooling assists in solidification of the shells while they are airborne, thus generally eliminating the need for a liquid hardening bath required by the prior art and producing the above-noted improved capsule structure. Because less mass of material need be coled in the case of capsules less than about 300 microns in diameter, cooling by means of the surrounding atmosphere is generally sufficient to cause hardening of the shell walls in sufficiently short times to make practical trajectory lengths possible. In practice, in the case of capsules of all diameters, it is preferred that cooling proceed both from the interior and exterior, with the major amount being interior cooling.

The velocity of the fill material emerging from the fill liquid orifice must be at least about 1 meter per second in order to form a jet. At lower velocities a jet useful in forming a biliquid column which can be directed into a trajectory path in not formed. In order for uniform breakup of the biliquid column into capsules to occur, the flow of the fill liquid as it emerges from the orifice must be streamline or laminar. At high fill liquid velocities, turbulent flow and irregular breakup of the column occurs producing many misshaped, non-uniform, or leaky capsules, and in general a wide spread of capsule sizes. At very high turbulent velocities an atomization and separation of the shell and fill materials results rather than encapsulation. The velocity above which turbulence occurs varies greatly for different liquids, jet directing nozzles, and the nature of the gaseous atmosphere into which the biliquid column is directed (reduced pressure and/or low density atmospheres causing less turbulence, thus making higher velocities possible). Turbulence can also be reduced by using a more viscous fill material. The viscosity can be increased by adding thickeners. Such thickeners may be insoluble, such as finely divided silica; or soluble, such as soluble polymers. Turbulence in the biliquid column occurs at fill liquid velocities above a critical velocity which is generally less than 100 meters per second, and in the case of aqueous fill liquids generally less than 25 meters per second. With the embodiment of FIGURE 2, both the fill and shell forming liquids must be discharged as jets in which laminar flow conditions exist.

In order for the desired laminar or streamline flow in the nozzle to occur, the Reynolds number characterizing the flow of the fill liquid (also the encapsulating liquid in the modification of FIGURE 2) discharged through the orifice should be below about 4000, and more preferably below 2000, because some turbulence at the center of the stream may occur at Reynolds numbers between 2000 and 4000. The Reynolds number, Re, as used herein, is defined as:

$$Re = \frac{D\rho v}{\mu}$$

where

D is the orifice diameter,
$p$ is the density of the fill liquid.
$v$ is the velocity of the fill liquid, and
$\mu$ is the viscosity of the fill liquid.

This Reynolds number equation is that for circular pipes running full. Under laminar flow conditions the relationship between the pressure drop in the fill liquid nozzle, the nozzle length and orifice diameter, the fill liquid viscosity and the fill liquid velocity, is given by the well-known Poiseuille equation. In the modification of FIGURE 2, the laminar flow conditions of the encapsulating liquid can be calculated by substituting the values for the encapsulating liquid in the above equations.

The capsule diameter is to a large degree dependent on the liquid fill orifice size and the amount of shell-forming material. Orifice diameters between about 5 and 1500 microns have been found suitable. The capsules produced generally have diameters about 1½ to 6 times the orifice diameter depending on the amount of shell-forming material present and the viscosity thereof. It has generally been found that a small percentage (e.g. less than 5% by weight) of small "satellite" capsules about 1/10 diameter of the bulk of the capsules are formed.

In the case of the apparatus of FIGURE 1, for a given combination of fill and shell forming materials, the thickness of the capsule shells is dicated by the depth of immersion of the orifice beneath the surface of the molten shell material. The capsule shell thickness is proportional to this immersion depth. Also, in the case of this embodiment, the shell thickness increases as the interfacial tension between the fill and shell is decreased. The interfacial tension, however, must be greater than 0, because if this condition existed, the materials would dissolve in each other rather than forming a concentric biliquid column and capsules. The lower the interfacial tension, the greater the affinity between shell and fill materials, and therefore the greater the amount of wall material pulled along by the jet of fill material. Increasing the viscosity of the wall material, as by operating the process at a lower temperature, also increases the wall thickness. One way to control the viscosity of the materials is to raise or lower the temperature of the fill and/or shell materials. It will be understood, however, that the temperature must be sufficiently high to permit the flow of the materials into capsular form prior to congealing. In the cases of the embodiments of FIGURES 2 and 3, the shell thickness can be limited by the amount of encapsulating material furnished by the pumps or other pressure producing means used to supply the encapsulating liquid.

It has been found that with all of the illustrated embodiments, good capsules are formed when the interfacial tension between the fill and encapsulating materials is low, short of actual dissolution of the materials within each other. It is preferred that the interfacial tension be less than 60 dynes/centimeter. The interfacial tension can often be reduced by the addition of a surfactant to the fill liquid. In the case of aqueous fill liquids encapsulated in organic shell materials, the interfacial tension can generally be reduced to below 10 dynes/centimeter by surfactant addition. It is possible to form capsules when the interfacial tension between the liquids is as high as 200 dynes/centimeter, as is the case with capsules made with metal shell materials. However, at such high interfacial tensions, the yield of capsules is usually low, i.e. 5 to 10%. The condition of high interfacial tension usually exists between two liquids when one of them has a very high surface tension (e.g. 250 dynes/centimeter) and the other has a low surface tension (e.g. 20 dynes/centimeter). In general, high interfacial tension between the liquids is less of a problem in the capsule-forming process when the fill material is the liquid with the higher surface tension, as this arrangement tends to favor stability of the capsule configuration. The higher surface tension material preferably forms the fill material, while the lower surface tension material preferably forms the shell, this being the only relationship possible in the embodiment of FIGURE 2. However, the reverse arrangement is possible with the embodiments of FIGURES 1 and 3 by simply supplying the lower surface tension material as the fill to form the core of the biliquid column.

By operating the process at conditions wherein solidification of the encapsulating materials occurs very rapidly after formation of the biliquid column, it is possible to form hardened strings of capsules of indefinite length in which hardened strands of encapsulating material connect the individual capsules. Such strings of capsules have separate utility in addition to that of the individual capsules. For example, if the fill material is an adhesive liquid, the strings of capsules filled with the adhesive can be laid down along a surface on which it is desired to apply the adhesive for later release, thus providing a line of releasable adhesive. Further applications of these materials will be apparent to those skilled in the art.

As capsules separate from the biliquid column they fall into a pattern of somewhat different sizes which follow different trajectories, thereby reducing the tendency for collisions among capsules. Usually a natural trajectory is used, but a desired trajectory can be achieved by deflecting a vertical discharged stream of capsules with an air stream having horizontal components. Horizontal movement of the nozzle can also be used to further reduce the likelihood of collisions among capsules.

The invention will be further illustrated by the following examples in which all parts are given by weight unless otherwise indicated. All viscosities given are at the operating temperatures. Reynolds numbers where given are for the fill liquids flow.

EXAMPLE I

Apparatus as illustrated in FIGURE 1 was used to form capsules of an aqueous fill material in wax shells. The nozzle was inclined at an angle 30° from the vertical. The nozzle was provided with an orifice 0.167 mm. in diameter and was immersed in the bath to a depth of 1 mm. The fill liquid had the following composition:

| | Parts |
|---|---|
| Water | 97.6 |
| Copolymer of methyl vinyl ether and maleic anhydride (commercially available under the designation "Gantrez AN–169") | 1.0 |
| Hydroxyl terminated block copolymer of ethylene oxide and propylene oxide nonionic surfactant (commercially available under the designation "Pluronic L–64") | 1.0 |
| Magenta dye | 0.4 |

The shell composition was as follows:

| | |
|---|---|
| Paraffin wax, M.P. 55° C. | 44.95 |
| Paraffin wax, M.P. 83° C. | 44.95 |
| Copolymer of ethylene and ethyl acrylate (commercially available under the designation "Dow EA–2018") | 10 |
| Butylated hydroxy toluene (anti-oxidant) | 0.1 |

One liter of filtered fill solution was placed in the reservoir to which 1 atmosphere gauge pressure was applied. The tmeperature of the fill liquid was 24° C. The wax temperature was 170° C., and the tip winding was heated to about 400° C. The needle valve was opened and the fill solution was discharged at a rate of 4.5 meters per second. The Reynolds number characterizing the flow of fill liquid through the nozzle was 150 (measured before immersion in wax). The wax solidified at a distance approximately 80 cm. from the orifice which was 0.4 seconds travel time of the wax in the trajectory path. This time was sufficient to permit the biliquid column formed by the discharging aqueous solution and the molten wax pulled along therewith to first form a string of capsules and then to separate into individual discrete capsules. Capsules were produced at a rate of about 60,000 per minute. The total trajectory length was about 12 feet (about one second total time in trajectory) after which the capsules were allowed to fall onto an inclined plane from which they proceeded to a collecting trough. The capsules collected were 700 microns in average diameter and had a shell thickness of about 50 microns. The fill liquid comprised about 63% of the total capsule volume and the shell material about 37%. The capsules are useful in preparing pressure activatable self-marking devices such as sheet materials.

It was found that if the nozzle was raised to a shallower immersion depth the emerging stream of aqueous liquid fill material would pull less molten wax with it and thus the shell material would harden after a shorter travel distance from the nozzle, due to relatively lower heat content of the biliquid column, so that a hardened string of capsules could be formed and collected. This occurred when hardening of the shell material took place at about 11 cm. from the nozzle.

In Examples II through XXIII following, the nozzle angle and trajectory length were about the same as for this Example I.

EXAMPLE II

This example illustrates the encapsulation of water in a low melting metal alloy. The apparatus used is in FIGURE 1 of the drawings, with the exception that the nozzle tip was copper plated to insure wetting by the alloy, and the heater windings at the tip of the nozzle were not used. Details as to the fill material, raw material, operating conditions, and capsule dimensions are given below:

Fill

| | |
|---|---|
| Temperature | 23° C. |
| Viscosity | 1 cps. |
| Density | 1 gm./cc. |
| Surface tension | 73 dynes/cm. |
| Melting point | 0° C. |
| Boiling point | 100° C. |
| Composition | 100% H₂O. |

Wall

| | |
|---|---|
| Temperature | 150° C. |
| Viscosity | About 5 cps. |
| Density | About 9.7 gm./cc. |
| Surface tension | About 240 dynes/cm. |
| Melting point | 72° C. |
| Boiling point | ~760° C. |
| Composition | Alloy of 50% Bi, 25% Pb, 12.5% Sn, 12.5% Cd. |

Operating conditions

| | |
|---|---|
| Fill material temperature | 23° C. |
| Shell material temperature | 150° C. |
| Nozzle orifice diameter | 0.300 mm. |
| Pressure applied to fill reservoir | 50 p.s.i.g. (3.4 atm. g.) |
| Fill ejection velocity | 3 m./sec. |
| Reynolds number | 900. |
| Orifice immersion depth | 0.7 mm. |

Capsule dimensions

| | |
|---|---|
| Diameter | 0.5±0.3 mm. |
| Shell thickness | 0.01–0.05 mm. |

The capsules were useful as latent curing agents for moisture curing of resins such as polyurethanes and polysulphides. The water was releasable by application of heat and/or pressure to the capsules.

EXAMPLE III

This example illustrates the encapsulation of a liquid glycol in a polyolefin resin. The apparatus used is shown in FIGURE 1. Heater windings were used around the nozzle tip to prevent freezing of the polyolefin over the orifice.

Fill

| | |
|---|---|
| Temperature | 115° C. |
| Viscosity | 3.8 cps. |
| Density | 1 g./cc. |
| Surface tension | 40 dynes/cm. |
| Melting point | −17° C. |
| Boiling point | 200° C. |
| Composition | 100% ethylene glycol. |

Wall

| | |
|---|---|
| Temperature | 215° C. |
| Viscosity | 110 cps. |
| Density | .7 g./cc. |
| Surface tension | 25 dynes/cm. |
| Melting point | 125° C. |
| Composition | 2000 molecular weight crystalline polyolefin. |

Operating conditions

| | |
|---|---|
| Fill material temperature | 115° C. |
| Shell material temperature | 215° C. |
| Nozzle orifice diameter | 0.189 mm. |
| Pressure applied to fill reservoir | 24 p.s.i.g. (1.6 atm. g.) |
| Fill ejection velocity | 2 m./sec. |
| Reynolds number | 100. |
| Orifice immersion depth | 1 mm. |

Capsule dimensions

| | |
|---|---|
| Diameter | 0.5±0.1 mm. |
| Shell thickness | 0.008±0.002 mm. |

EXAMPLE IV

This example illustrates the encapsulation of a latex within wax capsules. The apparatus and nozzle are of the type used in Example III.

Fill

| | |
|---|---|
| Temperature | 25° C. |
| Viscosity | 42 cps. |
| Density | 1.1 g./cc. |
| Surface tension | 30 dynes/cm. |
| Melting point | −4° C. |
| Boiling point | 103° C. |
| Composition | Polyvinyl chloride latex, 50% solids. |

Wall

| | |
|---|---|
| Temperature | 183° C. |
| Viscosity | 25 cps. |
| Density | 0.75 g./cc. |
| Surface tension | 28 dynes/cm. |
| Melting point | 72° C. |
| Composition (percent by weight) | |
| Paraffin wax, M.P. 55° C. | 44.95. |
| Paraffin wax, M.P. 83° C. | 44.95. |
| Copolymer of 80% ethylene, 20% ethyl acrylate; (melt index 18) | 10.00. |
| Butylated hydroxy toluene (antioxidant) | 0.10. |

Operating conditions

| | |
|---|---|
| Fill material temperature | 25° C. |
| Shell material temperature | 183° C. |
| Nozzle orifice diameter | 0.418 mm. |
| Pressure applied to fill reservoir | 19 p.s.i.g. (1.3 atm. g.). |
| Fill ejection velocity | 4 m./sec. |
| Reynolds number | 44. |
| Orifice immersion depth | 1.5 mm. |

Capsule dimensions

| | |
|---|---|
| Diameter | 1.0±0.3 mm. |
| Shell thickness | 0.060±0.005 mm. |

EXAMPLE V

This example illustrates the encapsulation of an aqueous liquid in another metal alloy. The apparatus and nozzle used were the type used in Example II.

Fill

| | |
|---|---|
| Temperature | 35° C. |
| Viscosity | About 5 cps. |
| Density | About 7 g./cc. |
| Surface tension | About 30 dynes/cm. |
| Melting point | About −2° C. |
| Boiling point | About 100° C. |
| Composition | 97.6% $H_2O$; 1.0% maleic anhydride—methyl, vinyl ether copolymer, viscosity increaser—(Gantrez AN-169); 1.0% hydroxy terminated ethylene glycol—propylene oxide block copolymer, surfactant (Pluronic L-64); 0.4% magenta dye. |

Wall

| | |
|---|---|
| Temperature | 125° C. |
| Viscosity | About 5 cps. |
| Density | About 9 g./cc. |
| Surface tension | About 200 dynes/cm. |
| Melting point | 48° C. |
| Boiling point | ~1200° C. |
| Composition | Alloy of 49% bismuth, 18% lead, 12% tin, 21% indium. |

Operating conditions

| | |
|---|---|
| Fill material temperature | 35° C. |
| Shell material temperature | 125° C. |
| Nozzle orifice diameter | 0.350 mm. |
| Pressure applied to fill reservoir | 20 p.s.i.g. (1.4 atm. g.). |
| Fill ejection velocity | 5 m./sec. |
| Reynolds number | 350. |
| Orifice immersion depth | 2 mm. |

Capsule dimensions

| | |
|---|---|
| Diameter | 1.2±0.4 mm. |
| Shell thickness | 0.015±0.002 mm. |

EXAMPLE VI

This example illustrates the encapsulation of an aqueous liquid within an inorganic salt. The apparatus and nozzle used were the type described in Example III. The ammonium hydroxide caused a precipitation of magnesium hydroxide, which prevented dissolution of the shells for about ten minutes. Although the capsules of this example had only a limited shelf life, this shelf life could be increased by increasing the hydroxyl ion concentration sufficiently to convert all of the shell material to $Mg(OH)_2$.

Fill

| | |
|---|---|
| Temperature | 23° C. |
| Viscosity | 1 cps. |
| Density | 1 g./cc. |
| Surface tension | About 55 dynes/cm. |
| Boiling point | 100° C. |
| Composition | 0.3 N $NH_4OH$ in $H_2O$. |

Wall

| | |
|---|---|
| Temperature | 130° C. |
| Viscosity | 10 cps. |
| Density | 1.4 g./cc. |
| Surface tension | 72° C. |
| Boiling point | 135° C. |
| Composition | Magnesium nitrate hexahydrate. |

Operating conditions

| | |
|---|---|
| Fill material temperature | 23° C. |
| Shell material temperature | 130° C. |
| Nozzle orifice diameter | 0.250 mm. |
| Pressure applied to fill reservoir | 2 p.s.i.g. (0.14 atm. g.). |
| Fill ejection velocity | 2 m./sec. |
| Reynolds number | 500. |
| Orifice immersion depth | 1 mm. |

Capsule dimensions

| | |
|---|---|
| Diameter | 0.4±0.2 mm. |
| Shell thickness | 0.020±0.003 mm. |

EXAMPLE VII

This example illustrates the encapsulation of an aqueous amine solution within a resin. The apparatus and nozzle were the type described in Example III. The capsules produced were useful as latent (pressure and/or heat activatable) curing agents for resins such as epoxy resins.

Fill

| | |
|---|---|
| Temperature | 80° C. |
| Viscosity | About 2 cps. |
| Density | About 1.4 g./cc. |
| Surface tension | About 70 dynes/cm. |
| Melting point | 30° C. |
| Boiling point | 105° C. |
| Composition | 70% imidazole, 30% $H_2O$. |

WALL

| | |
|---|---|
| Temperature | 200° C. |
| Viscosity | About 100 cps. |
| Density | About .9 g./cc. |
| Surface tension | About 30 dynes/cm. |
| Melting point | About 90° C. |
| Composition (percent by wt.) | 100% Polyamide resin (Versamid 725). |

Operating conditions

| | |
|---|---|
| Fill material temperature | 80° C. |
| Shell material temperature | 200° C. |
| Nozzle orifice diameter | 0.185 mm. |
| Pressure applied to fill reservoir | 12 p.s.i.g. (0.8 atm. g.). |
| Fill ejection velocity | 3 m./sec. |
| Reynolds number | 390. |
| Orifice immersion depth | 1 mm. |

Capsule dimensions

| | |
|---|---|
| Diameter | 0.6±0.2 mm. |
| Shell thickness | 0.014±0.002 mm. |

EXAMPLE VIII

This example illustrates the encapsulation of perfume in wax capsules. The capsules were suitable for coating on paper, such as tissue paper, and could be ruptured by rubbing the paper over the skin or another surface. The apparatus used was of the type described in Example III.

Fill

| | |
|---|---|
| Temperature | 23° C. |
| Viscosity | About 6 tps. |
| Density | About .8 g./cc. |
| Surface tension | About 30 dynes/cm. |
| Composition | 66.7% diethylphthalate, 33.3% perfume concentrate. |

Wall

| | |
|---|---|
| Temperature | 160° C. |
| Viscosity | About 15 cps. |
| Density | About .7 g./cc. |
| Surface tension | About 28 dynes/cm. |
| Melting point | About 60° C. |
| Composition | 89.9% paraffin wax, M.P. 55° C., 10% ethylene-vinyl acetate copolymer; .1% butylated hydroxy toluene. |

Operating conditions

| | |
|---|---|
| Fill material temperature | 23° C. |
| Shell material temperature | 160° C. |
| Nozzle orifice diameter | 0.250 mm. |
| Pressure applied to fill reservoir | 2 p.s.i.g. (0.14 atm. g.) |
| Fill ejection velocity | 6 m./sec. |
| Reynolds number | 200. |
| Orifice immersion depth | 3 mm. |

Capsule Dimensions

| | |
|---|---|
| Diameter | 0.80±0.1 mm. |
| Shell thickness | 0.055±0.005 mm. |

EXAMPLE IX

This example illustrates the encapsulation of water in a wax composition, the resulting capsules being considerably smaller than those of Example VIII.

Fill

| | |
|---|---|
| Temperature | 24° C. |
| Viscosity | 1 cps. |
| Density | 1 g./cc. |
| Surface tension | 73 dynes/cm. |
| Melting point | 0° C. |
| Boiling point | 100° C. |
| Composition | 100% $H_2O$. |

Wall

| | |
|---|---|
| Temperature | 150° C. |
| Viscosity | About 20 cps. |
| Density | About .7 g./cc. |
| Surface tension | About 25 dynes/cm. |
| Melting point | About 50° C. |
| Composition (percent by wt.) | 89.9% paraffin wax, M.P. 55° C., 10% ethylene-vinyl acetate copolymer; .1% butylated hysolution) =0.57. |

Operating conditions

| | |
|---|---|
| Fill material temperature | 24° C. |
| Shell material temperature | 150° C. |
| Nozzle orifice diameter | 0.0155 mm. |
| Pressure applied to fill reservoir | 500 p.s.i.g. (34 atm. g.). |
| Fill ejection velocity | 6 m./sec. |
| Reynolds number | 93. |
| Orifice immersion depth | 0.7 mm. |

Capsule dimensions

| | |
|---|---|
| Diameter | 0.030±0.005 mm. |
| Shell thickness | 0.002±0.001 mm. |

EXAMPLE X

This example illustrates the encapsulation of an aqueous formic acid solution in wax-polymer shelled capsules. The apparatus used is the same as that described in Example III. The capsules are useful as a co-sterilant with ethylene oxide, when ruptured.

Fill

| | |
|---|---|
| Temperature | 23° C. |
| Viscosity | About 4 cps. |
| Density | About 1.1 g./cc. |
| Surface tension | About 50 dynes/cm. |
| Melting point | 8° C. |
| Boiling point | 100° C. |
| Composition | 98% aqueous formic acid (88%); 2% polyvinyl methyl ether; 50% solution in $H_2O$, inherent viscosity, (1 gm./100 ml. solution) =0.57. |

Wall

| | |
|---|---|
| Temperature | 180° C. |
| Viscosity | About 20 cps. |
| Density | About .7 g./cc. |
| Surface tension | About 25 dynes/cm. |
| Melting point | About 82° C. |
| Composition | 89.9% paraffin wax M.P. 83° C.; 10.0% copolymer of 80% ethylene; 20% ethyl acrylate, (melt index 18); 0.1% butylated hydroxy toluene. |

Operating conditions

| | |
|---|---|
| Fill material temperature | 23° C. |
| Shell material temperature | 180° C. |
| Nozzle orifice diameter | 0.183 mm. |
| Pressure applied to fill reservoir | 15 p.s.i.g. (1 atm. g.). |
| Fill ejection velocity | 2 m./sec. |
| Reynolds number | 150. |
| Orifice immersion depth | 1.5 mm. |

Capsule dimensions

| | |
|---|---|
| Diameter | 0.7±0.2 mm. |
| Shell thickness | 0.050±0.005 mm. |

EXAMPLE XI

This example illustrates the capsulation of a peroxide catalyst within wax compostion shelled capsules. Apparatus used was similar to that described in Example III. The capsules were useful in formulating latent curing polyester resin compositions which could be cured by rupture of the capsules by application of heat or pressure.

Fill

| | |
|---|---|
| Temperature | 23° C. |
| Viscosity | 10 cps. |
| Density | About 1 g./cc. |
| Surface tension | About 25 dynes/cm. |
| Boiling point | About 100° C. |
| Composition (percent by wt.) | 70% methyl ethyl ketone peroxides; 30% H₂O. |

Wall

| | |
|---|---|
| Temperature | 180° C. |
| Viscosity | About 20 cps. |
| Density | About .7 g./cc. |
| Surface tension | About 25 dynes/cm. |
| Melting point | About 82° C. |
| Composition | 89.9% paraffin wax, M.P. 83° C.; 10.0% copolymer of 80% ethylene, 20% ethyl acrylate (melt index 18); 0.1% butylated hydroxy toluene. |

Operating conditions

| | |
|---|---|
| Fill material temperature | 23° C. |
| Shell material temperature | 180° C. |
| Nozzle orifice diameter | 0.183 mm. |
| Pressure applied to fill reservoir | 16 p.s.i.g. (1.1 atm. g.). |
| Fill ejection velocity | 3.5 m./sec. |
| Reynolds number | 64. |
| Orifice immersion depth | 2 mm. |

Capsule dimensions

| | |
|---|---|
| Diameter | 0.7±0.1 mm. |
| Shell thickness | 0.060±0.005 mm. |

EXAMPLE XII

This example illustrates the encapsulation of an aqueous liquid in wax composition shelled capsules in which relatively large capsules were produced. The apparatus and nozzle used were similar to those described in Example III.

Fill

| | |
|---|---|
| Temperature | 23° C. |
| Viscosity | About 6 cps. |
| Density | 1 g./cc. |
| Surface tension | About 25 dynes/cm. |
| Melting point | −5° C. |
| Boiling point | 102° C. |
| Composition | 97.0% H₂O; 2.0% copolymer of methyl vinyl ether and maleic anhydride (Gantrez AN–169); 1.0% Pluronic L–64. |

Wall

| | |
|---|---|
| Temperature | 180° C. |
| Viscosity | About 20 cps. |
| Density | About .7 g./cc. |
| Surface tension | About 25 dynes/cm. |
| Melting point | 82° C. |
| Composition | 89.9% paraffin wax, M.P. 83° C.; 10.0% copolymer of 80% ethylene, 20% ethyl acrylate (melt index 18); 0.1% butylated hydroxy toluene. |

Operating conditions

| | |
|---|---|
| Fill material temperature | 23° C. |
| Shell material temperature | 180° C. |
| Nozzle orifice diameter | 1.197 mm. |
| Pressure applied to fill reservoir | 12 p.s.i.g. (0.8 atm. g.) |
| Fill ejection velocity | 4.5 m./sec. |
| Reynolds number | 900. |
| Orifice immersion depth | 3 mm. |

Capsule dimensions

| | |
|---|---|
| Diameter | 3.5±0.5 mm. |
| Shell thickness | 0.275±0.025 mm. |

EXAMPLE XIII

In this example water was encapsulated within the polyamid resin which also contained dicyclohexylphthalate plasticizer. The apparatus and nozzle are again similar to that described in Example III.

Fill

| | |
|---|---|
| Temperature | 68 dynes/cm. |
| Viscosity | 50° C. |
| Density | .5 cps. |
| Surface tension | .99 g./cc. |
| Melting point | 0° C. |
| Boiling point | 100° C. |
| Composition | 100% H₂O. |

Wall

| | |
|---|---|
| Temperature | 200° C. |
| Melting point | 90° C. |
| Composition (percent by wt.) | 47.5% polyamide resin (Versalon 1165); 52.5% dicyclohexylphthalate. |

Operating conditions

| | |
|---|---|
| Fill material temperature | 50° C. |
| Shell material temperature | 200° C. |
| Nozzle orifice diameter | 0.155 mm. |
| Pressure applied to fill reservoir | 15 p.s.i.g. (1 atm. g.) |
| Fill ejection velocity | 2 m./sec. |
| Reynolds number | 620. |
| Orifice immersion depth | 1.5 mm. |

Capsule dimensions

| | |
|---|---|
| Diameter | 0.6±0.1 mm. |
| Shell thickness | 0.060±0.005 mm. |

EXAMPLE XIV

An oil was encapsulated in an inorganic salt. The apparatus and nozzle used were similar to that described in Example III. These capsules could be subsequently fired and sintered to form hollow refractory oxide spheres useful as a low density high temperature insulating material.

Fill

| | |
|---|---|
| Temperature | 23° C. |
| Viscosity | 3.2 cps. |
| Density | .8 g./cc. |
| Surface tension | 23 dynes/cm. |
| Melting point | −12° C. |
| Boiling point | 215° C. |
| Composition | 100% dodecane (oil). |

Wall

| | |
|---|---|
| Temperature | 120° C. |
| Viscosity | 11.3 cps. |
| Density | 1.4 g./cc. |
| Melting point | 72° C. |
| Boiling point | 135° C. |
| Composition | Magnesium nitrate hexahydrate. |

Operating conditions

| | |
|---|---|
| Fill material temperature | 23° C. |
| Shell material temperature | 120° C. |
| Nozzle orifice diameter | 0.250 mm. |
| Pressure applied to fill reservoir | 20 p.s.i.g. (1.4 atm. g.) |
| Fill ejection velocity | 3 m./sec. |
| Reynolds number | 190. |
| Orifice immersion depth | 2 mm. |

Capsule dimensions

| | |
|---|---|
| Diameter | 0.4±0.2 mm. |
| Shell thickness | 0.020±0.003 mm. |

EXAMPLE XV

In this example ethylene glycol is encapsulated within 2000 molecular weight polyethylene. The apparatus used was similar to that described in Example III. The capsules were useful for providing pressure releasable plasticizers or adhesive activators.

Fill

| | |
|---|---|
| Temperature | 100° C. |
| Viscosity | 4.5 cps. |
| Density | 1 g./cc. |
| Surface tension | 40 dynes/cm. |
| Melting point | −17° C. |
| Boiling point | 200° C. |
| Composition | 100% ethylene glycol. |

Wall

| | |
|---|---|
| Temperature | 200° C. |
| Viscosity | 150 cps. |
| Density | .7 g./cc. |
| Surface tension | 26 dynes/cm. |
| Melting point | 110° C. |
| Composition | 100%—2000 molecular weight polyethylene. |

Operating conditions

| | |
|---|---|
| Fill material temperature | 100° C. |
| Shell material temperature | 200° C. |
| Nozzle orifice diameter | 0.189 mm. |
| Pressure applied to fill reservoir | 24 p.s.i.g. (1.6 atm. g.) |
| Fill ejection velocity | 4 m./sec. |
| Reynolds number | 170. |
| Orifice immersion depth | 1 mm. |

Capsule dimensions

| | |
|---|---|
| Diameter | 0.40±0.05 mm. |
| Shell thickness | 0.006±0.001 mm. |

EXAMPLE XVI

In this example ethylene glycol is encapsulated within methylene bis-steramid. Apparatus used was similar to that described in Example III.

Fill

| | |
|---|---|
| Temperature | 115° C. |
| Viscosity | 3.8 cps. |
| Density | 1 gm./cc. |
| Surface tension | 40 dynes/cm. |
| Melting point | −17° C. |
| Boiling point | 200° C. |
| Composition | 100% ethylene glycol. |

Wall

| | |
|---|---|
| Temperature | 160° C. |
| Viscosity | About 4 cps. |
| Density | .8 g./cc. |
| Surface tension | 30 dynes/cm. |
| Melting point | 132° C. |
| Composition | 100% methylene bis-steramid. |

Operating conditions

| | |
|---|---|
| Fill material temperature | 115° C. |
| Shell material temperature | 160° C. |
| Nozzle orifice diameter | 0.189 mm. |
| Pressure applied to fill reservoir | 22 p.s.i.g. (1.5 atm. g.) |
| Fill ejection velocity | 2.5 m./sec. |
| Reynolds number | 125. |
| Orifice immersion depth | 1.5 mm. |

Capsule dimensions

| | |
|---|---|
| Diameter | 0.6±0.2 mm. |
| Shell thickness | 0.020±0.008 mm. |

EXAMPLE XVII

In this example an aqueous solution containing sodium pyrovanadate is encapsulated in a paraffin wax, using apparatus of the type described in Example III. These capsules are useful as one part of a two part pressure activatable imaging system. The other part is described in Example XVIII below.

Fill

| | |
|---|---|
| Temperature | 23° C. |
| Viscosity | 1 cps. |
| Density | 1 g./cc. |
| Surface tension | 60 dynes/cm. |
| Melting point | −4° C. |
| Boiling point | 102° C. |
| Composition | 98% H$_2$O; 2% sodium pyrovanadate. |

Wall

| | |
|---|---|
| Temperature | 140° C. |
| Viscosity | 4 cps. |
| Density | .73 g./cc. |
| Surface tension | 24 dynes/cm. |
| Melting point | 55° C. |
| Composition | 100% paraffin wax, M.P. 55° C. |

Operating conditions

| | |
|---|---|
| Fill material temperature | 23° C. |
| Shell material temperature | 140° C. |
| Nozzle orifice diameter | 0.250 mm. |
| Pressure applied to fill reservoir | 1 p.s.i.g. (0.07 atm. g.) |
| Fill ejection velocity | 2.6 m./sec. |
| Reynolds number | 650. |
| Orifice immersion depth | 1.5 mm. |

Capsule dimensions

| | |
|---|---|
| Diameter | 0.6±0.2 mm. |
| Shell thickness | 0.015±0.003 mm. |

EXAMPLE XVIII

In this example an aqueous acid solution was encapsulated in a paraffin wax, using apparatus of the type disclosed in Example III. The capsules could be used as one part of a two part pressure activatable imaging system. The other part is described in Example XVII above.

Fill

| | |
|---|---|
| Temperature | 23° C. |
| Viscosity | 1 cps. |
| Density | 1 g./cc. |
| Boiling point | 102° C. |
| Composition | 93% $H_2O$; 2% 8-hydroxy quinoline; 5% acetic acid. |

Wall

| | |
|---|---|
| Temperature | 140° C. |
| Viscosity | 4 cps. |
| Density | .85 g./cc. |
| Surface tension | 24 dynes/cm. |
| Melting point | 55° C. |
| Composition (percent by wt.) | 100% paraffin wax, M.P. 55° C. |

Operating conditions

| | |
|---|---|
| Fill material temperature | 23° C. |
| Shell material temperature | 140° C. |
| Nozzle orifice diameter | 0.250 mm. |
| Pressure applied to fill reservoir | 1 p.s.i.g. (0.07 atm. g.). |
| Fill ejection velocity | 2.6 m./sec. |
| Reyonlds number | 650. |
| Orifice immersion depth | 1.5 mm. |

Capsule dimensions

| | |
|---|---|
| Diameter | 0.6±0.2 mm. |
| Shell thickness | 0.015±0.003 mm. |

EXAMPLE XIX

Water was encapsulated in a low molecular weight polymer, using apparatus similar to that described in Example III.

Fill

| | |
|---|---|
| Temperature | 90° C. |
| Viscosity | 0.3 cps. |
| Density | .97 g./cc. |
| Surface tension | 60 dynes/cm. |
| Melting point | 0° C. |
| Boiling point | 100° C. |
| Composition | 100% $H_2O$. |

Wall

| | |
|---|---|
| Temperature | 200° C. |
| Viscosity | 200 cps. |
| Density | .7 g./cc. |
| Surface tension | 28 dynes/cm. |
| Melting point | 100° C. |
| Composition (percent by wt.) | 100% — 3500 molecular weight, polyethylene copolymer. |

Operating conditions

| | |
|---|---|
| Fill material temperature | 90° C. |
| Shell material temperature | 200° C. |
| Nozzle orifice diameter | 0.189 mm. |
| Pressure applied to fill reservoir | 24 p.s.i.g. (1.6 atm. g.). |
| Fill ejection velocity | 5 m./sec. |
| Reyonlds number | 3000. |
| Orifice immersion depth | 0.5 mm. |

Capsule dimensions

| | |
|---|---|
| Diameter | 0.5±0.1 mm. |
| Shell thickness | 0.002 mm. |

EXAMPLE XX

An aqueous liquid was encapsulated in a fluorinated low molecular weight polymer using apparatus similar to that described in Example III. The fluorinated polymer shells provide solvent resistant capsules.

Fill

| | |
|---|---|
| Temperature | 80° C. |
| Viscosity | 1 cps. |
| Density | 1 g./cc. |
| Surface tension | 40 dynes/cm. |
| Melting point | −4° C. |
| Boiling point | 102° C. |
| Composition | 99.89% $H_2O$; 0.10%, 25% aqueous solution of $Na_2SO_4$ derivative of 3,9-diethyl tridecanol-6 (Tergitol-7); 0.01% crystal violet dye. |

Wall

| | |
|---|---|
| Temperature | 190° C. |
| Viscosity | 30 cps. |
| Density | 1.8 g./cc. |
| Surface tension | 25 dynes/cm. |
| Melting point | 90° C. |
| Composition (percent by wt.) | 100% $Cl(CF_2CFCl)_{50}Cl$, M.P. 90° C., (Kel–F 200). |

Operating conditions

| | |
|---|---|
| Fill material temperature | 80° C. |
| Shell material temperature | 100° C. |
| Nozzle orifice diameter | 0.250 mm. |
| Pressure applied to fill reservoir | 1 p.s.i.g. (0.07 atm. g.). |
| Fill ejection velocity | 2.5 m./sec. |
| Reyonlds number | 500. |
| Orifice immersion depth | 2 mm. |

Capsule dimensions

| | |
|---|---|
| Diameter | 0.6±0.1 mm. |
| Shell thickness | 0.009±0.002 mm. |

EXAMPLE XXI

This is an example of the encapsulation of an edible flavoring agent within a water soluble, edible, nutritive shell material.

Fill

| | |
|---|---|
| Temperature | 24° C. |
| Viscosity | 6 cps. |
| Density | About .9 g./cc. |
| Surface tension | About 30 dynes/cm. |
| Boiling point | >170° C. |
| Composition (percent by wt.) | 100% edible oil-containing orange flavor concentrate. |

Wall

| | |
|---|---|
| Temperature | 235° C. |
| Viscosity | About 40 cps. |
| Density | About 1.3 g./cc. |
| Surface tension | About 50 dynes/cm. |
| Melting point | 167° C. |
| Boiling point | 295° C. (at 3.5 mm. Hg). |
| Composition (percent by wt.) | 100% D-mannitol $H(CHOH)_6H$. |

Operating conditions

| | |
|---|---|
| Fill material temperature | 24° C. |
| Shell material temperature | 235° C. |
| Nozzle orifice diameter | 0.267 mm. |

Operating conditions (continued)

Pressure applied to fill reservoir _________________ 10 p.s.i.g. (0.7 atm. g.).
Fill ejection velocity ______ 6 m./sec.
Orifice immersion depth ___ 1 mm.

Capsule size

Diameter _______________ 0.900±0.100 mm.
Shell thickness ___________ 0.020±0.005 mm.

These capsules are useful as a latent flavoring agent. Flavor release may be by heat, pressure and/or solution. The shells will melt, fracture, and dissolve (in water). They were prepared using procedure and apparatus similar to that described in Example III. The capsule shells froze to form a glass, and remained glassy in storage. Some of the capsules had not completely frozen at the end of the trajectory. Collection in cold mineral oil increased the yield of frozen capsules. Capsules collected in mineral oil were washed with hexane and air dried.

EXAMPLE XXII

In this example a thixotropic aqueous solution was encapsulated within a wax composition. The capsules were useful as a latent pressure activatable image former when incorporated in a base sensitive system. The apparatus and nozzle are again similar to that described in Example III.

Fill

Temperature _____________ 23° C.
Viscosity (static) ________ 3500 cps.
Density _________________ 1 g./cc.
Surface tension __________ 50 dynes/cm.
Boiling point ____________ 100° C.
Composition _____________ 88% $H_2O$.
                                 6.9% $(NH_4)_2 CO_3$.
                                 5.1% submicron sized silica powder.

Wall

Temperature _____________ 180° C.
Melting point ____________ 72° C.

Composition (percent by wt.) ___________________ 44.95% paraffin wax, M.P. 55° C.; 44.95% paraffin wax, M.P. 83° C.; 10.00% soluble copolymer of ethylene and ethyl acrylate (melt index—18); 0.1% BHT.

Operating conditions

Fill material temperature __ 23° C.
Shell material temperature _ 180° C.
Nozzle orifice diameter ___ 0.351 mm.
Pressure applied to fill reservoir _________________ 20 p.s.i.g. (1.4 atm. g.).
Fill ejection velocity ______ 6 m./sec.
Orifice immersion depth ___ 1 mm.

Capsule dimensions

Diameter _______________ 1.3±0.7 mm.
Shell thickness ___________ 0.120±0.010 mm.

EXAMPLE XXIII

In this example water containing a viscosity increasing additive was encapsulated within a wax composition. The apparatus and nozzle are again similar to that described in Example III. The capsules are useful as a pressure activatable latent curing agent for urethane resins.

Fill

Temperature _____________ 24° C.
Viscosity ________________ 7 cps.
Density _________________ 1 g./cc.
Surface tension __________ 50 dynes/cm.
Melting point ____________ 0° C.
Boiling point ____________ 100° C.
Composition _____________ 99.98% $H_2O$; .02% polyoxyethylene (molecular wt. $7 \times 10^6$).

Wall

Temperature _____________ 185° C.
Melting point ____________ 68° C.

Composition (percent by wt.) ___________________ 91.9% paraffin wax, M.P. 68° C.; 8.0% soluble copolymer of ethylene and ethyl acrylate (melt index—3).

Operating conditions

Fill material temperature __ 24° C.
Shell material temperature _ 185° C.
Nozzle orifice diameter ___ 0.504 mm.
Pressure applied to fill reservoir _________________ 6 p.s.i.g. (0.4 atm. g.).
Fill ejection velocity ______ 4 m./sec.
Reynolds number ________ 280.
Orifice immersion depth ___ 1.5 mm.

Capsule dimensions

Diameter _______________ 2.5±0.5 mm.
Shell thickness ___________ 0.125±0.035 mm.

EXAMPLE XXIV

Apparatus of the type shown in FIGURE 3 was used to encapsulate an aqueous liquid in wax shells. The details of the process are as follows:

Fill

Temperature _____________ 85° F., 29° C.
Viscosity ________________ About 5 cps.
Density _________________ About 1 g./cc.
Surface tension __________ About 30 dynes/cm.
Melting point ____________ About −2° C.
Boiling point ____________ About 100° C.
Composition _____________ 98% $H_2O$; 1% Gantrez AN-169 (see Ex. V); 1% Pluronic L-64 (see Ex. V).

Wall

Temperature _____________ 260° F., 127° C.
Viscosity ________________ About 25 cps.
Density _________________ About 0.7 g./cc.
Surface tension __________ 28 dynes/cm.
Melting point ____________ 62° C.
Boiling point ____________ About 207° C. (at 0.7 mm. Hg).
Composition _____________ 89.9% paraffin wax, M.P. 144° F., 62° C. (Shell wax—270); 10% copolymer 80% ethylene, 20% ethylacrylate (melt index —18) (Dow EA 2018); 0.1% butylated hydroxytoluene.

Operating conditions

Fill orifice diameter ______ 0.010 inch, 0.25 mm.
Shell orifice dimensions ____ 0.050 inch, 1.2 mm. inner diameter; 0.064 inch, 1.6 mm. outer diameter.

Operating conditions (continued)

Fill ejection rate _________ 23 ml./minute, or 7.6 m./second.
Wall material pumping velocity at orifice ________ 0.5 m./second.

Capsule dimensions

Average diameter ________ 650 microns.
Fill content _____________ 55 wt. percent.

The nozzle was inclined 30° upward from the horizontal. A concentric stream of fill liquid surrounded by molten shell material issued from the nozzle and subdivided into discrete capsules within several inches from the nozzle openings. The stream of capsules continued upward to a zenith approximately 18 inches, 46 cm., vertically above the nozzle, and then continued along a parabolic path to impact with fully congealed shells on an inclined surface approximately 8 ft., 2.4 m. distant, and 6 ft., 1.8 m., below the nozzle. The collected capsules were smooth, round, and non-blocking. When exposed to ambient conditions (75° F., 23° C., 40% relative humidity), the diffusional loss of contents was 0.20% per day, thus providing a half life of 241 days for the contents.

EXAMPLE XXV

The apparatus of Example XXIV was used to encapsulate an oily liquid in gelatin shells. The process conditions were the same, except as herein noted. The fill material comprised peanut oil containing 5% cinnamic aldehyde flavoring. The wall material was a sol of 20% 300 bloom porkskin gelatin and 80% water. It was preferred to use the wall material at 70% C. with room temperature as the preferred fill liquid temperature. The capsules again were collected at a distance of about 2.4 meters from the nozzle, were caught in a mass of cold mineral oil and allowed to gel. The capsules were washed with naphtha to remove the mineral oil, filtered, and washed with acetone to extract the water from the gelain. The resultant capsules had strong gelatin walls of an average thickness of 25 microns. The average capsule diameter was about 1200 microns. The capsules were edible, and the contents releasable either by pressure or solution in warm aqueous systems. Instead of free-flowing capsules, the capsules emitted from the apparatus can be collected and gelled into a sheet form made up of the individual capsules bonded to each other.

EXAMPLE XXVI

Apparatus of the type shown in FIGURE 2 was used to encapsulate water in wax. Both nozzles were directed upwardly at an angle about 45° from the vertical, and pointed toward each other so that jets issuing therefrom merged before breakup of either at a distance of about 5 mm. from each orifice. The angle subtended by the merging jets was about 30°. A biliquid column was formed immediately on merging of the jets in which the higher surface tension water formed the core and the lower surface tension wax formed a concentric enclosing tube. The column separated into individual capsules at a point about 3 cm. from the point of merging.

Fill

Temperature ______________ 24° C.
Viscosity _________________ 1 cps.
Density ___________________ 1 g./cc.
Surface tension ___________ 73 dynes/cm.
Melting point _____________ 0° C.
Boiling point _____________ 100° C.
Composition _______________ 100% H2O.

Wall

Temperature ______________ 180° C.
Viscosity _________________ 4 cps.
Density ___________________ About 0.7 g./cc.

Wall (continued)

Surface tension ___________ About 23 dynes/cm.
Melting point _____________ 55° C.
Composition _______________ 100% paraffin wax.

Operating conditions

Fill material temperature ______ 24° C.
Shell material temperature _____ 180° C.
Fill nozzle orifice diameter ____ 0.26 mm.
Shell nozzle orifice diameter ___ 0.40 mm.
Pressure applied to fill reservoir _ 10 p.s.i.g. (0.7 atm. g.).
Pressure applied to shell reservoir _____________________ 50 p.s.i.g. (3.4 atm. g.).
Fill ejection velocity _________ 3 m./sec.
Shell ejection velocity ________ 2 m./sec.
Trajectory path length (meters) _ 4

Capsule size

Diameter ____________________ .6 mm.
Shell thickness _____________ 0.05 mm.

What is claimed is:

1. A process for forming capsules which comprises providing a biliquid column comprising an outer tube of capsule shell forming material and a core of fill material to be encapsulated, said column being directed in a trajectory having a horizontal component for a time sufficient for the column to constrict along its length into spheroids of shell forming material each enclosing a core of fill material, and hardening said shell-forming material into solid shells encapsulating said fill material therewithin.

2. A process according to claim 1 wherein said shell forming material is a molten, normally solid material, said hardening occurring due to freezing of said shell-forming material.

3. A process according to claim 1 wherein said shell forming material comprises a molten organic material.

4. A process according to claim 3 wherein said shell forming material comprises a wax.

5. A process according to claim 3 wherein said shell forming material is a gellable colloid.

6. A process according to claim 1 wherein said shell forming material comprises a glass.

7. A process according to claim 1 wherein said shell forming material comprises a metal.

8. A process according to claim 1 wherein said fill material comprises an aqueous liquid.

9. A process according to claim 1 wherein said encapsulating material is hardened while the spheroids are interconnected by strands of encapsulating material, and including the step of collecting the hardened interconnected capsules.

10. A process for forming capsules which comprises providing a biliquid column comprising an outer tube of hardenable encapsulating material and a core of fill material to be encapsulated, such column being directed in a trajectory in a gaseous atmosphere for a time sufficient for the column to constrict along its length into individual spheroids of encapsulating material completely enclosing cores of fill material, and hardening said encapsulating material into solid spheroidal shells encapsulating said fill material therewithin.

11. A process according to claim 10 wherein said shells are spherical.

12. A process according to claim 10 wherein said column is formed by discharging a stream of fill material into said encapsulating material at a velocity sufficient to form a jet, said jet being directed to form said trajectory.

13. A process according to claim 12 wherein said stream is discharged within a body of encapsulating material and directed toward said gaseous atmosphere, said column being formed by frictional drag between said stream and said encapsulating material which causes said encapsulating material shell to be pulled along as a tube surrounding said stream as said jet emerges from said body into said gaseous atmosphere.

14. A process according to claim 10 wherein said column is formed by directing a jet of encapsulating material toward a jet of fill material, said jets merging to form said column.

15. A method for encapsulating liquids in capsules having diameters of from about 10 to 4000 microns comprising providing a hardenable liquid encapsulating material; discharging a jet of fill liquid to be encapsulated from an orifice having a diameter between about 5 and 1500 microns under pressure at a velocity greater than about 1 m./sec. into said encapsulating material, thereby forming a column of enclosing liquid encapsulating material concentrically surrounding said fill liquid, the dimensionless Reynolds number, $$\frac{D\rho v}{\mu}$$

being less than 4000, where D is the diameter of said orifice, $v$ is the velocity of said fill liquid discharged from said orifice, $\rho$ is the density of said fill liquid, and $\mu$ is the viscosity of said fill liquid, said encapsulating material having a viscosity less than about 2000 centipoises and a melting point lower than the boiling point of said fill liquid, the interfacial tension between said fill liquid and liquid encapsulating material being less than about 200 dynes per centimeter, said column being directed to travel in a trajectory path having a horizontal component into a gaseous atmosphere for a time sufficient to constrict along its length into individual capsules having shells of encapsulating material completely enclosing fill liquid therewithin, said fill liquid being at a lower temperature than said encapsulating liquid, hardening said capsule shells by internal cooling and collecting the resulting capsules.

References Cited

UNITED STATES PATENTS

| 2,932,061 | 4/1960 | Jansen | 264—4 |
| 3,202,533 | 8/1965 | Sachsel et al. | 264—4 |

ROBERT F. WHITE, *Primary Examiner.*

J. HALL, *Assistant Examiner.*

UNITED STATES PATENT OFFICE
CERTIFICATE OF CORRECTION

Patent No. 3,423,489                                                January 21, 1969

Robert P. Arens et al.

It is certified that error appears in the above identified patent and that said Letters Patent are hereby corrected as shown below:

Column 1, line 63, "fil" should read -- fill --. Column 2, line 8, "controled" should read -- controlled --; line 46, "strem" should read -- stream --. Column 5, line 7, "coled" should read -- cooled --. Column 7, line 43, "tmeperature" should read -- temperature --. Column 10, line 50, "Surface tension" should read -- Melting point --. Column 11, line 43, after "Viscosity------", "About 6 tps." should read -- About 6 cps. --. Column 12, line 25, "solution) = 0.57" should read -- droxy toluene --. Column 13, line 6, "2 m./sec." should read -- 3 m./sec. --. Column 14, cancel lines 36 to 39:

Temperature ------------- 68 dynes/cm.
                   Viscosity --------------- 50° C.
                   Density ----------------- .5 cps.
                   Surface tension --------- .99 g./cc.

and insert

Temperature ------------- 50° C.
                   Viscosity --------------- .5 cps.
                   Density ----------------- .99 g./cc.
                   Surface tension --------- 68 dynes/cm.

Column 18, line 32, after "Shell material temperature", cancel "100° C." and insert -- 190° C. --.

Signed and sealed this 31st day of March 1970.

(SEAL)
Attest:

EDWARD M. FLETCHER, JR.                                WILLIAM E. SCHUYLER, JR.
Attesting Officer                                                 Commissioner of Patents